July 4, 1939  H. WENDEBORN  2,165,084
PROCESS FOR THE PRODUCTION OF A SINTERED PRODUCT
Filed May 13, 1937
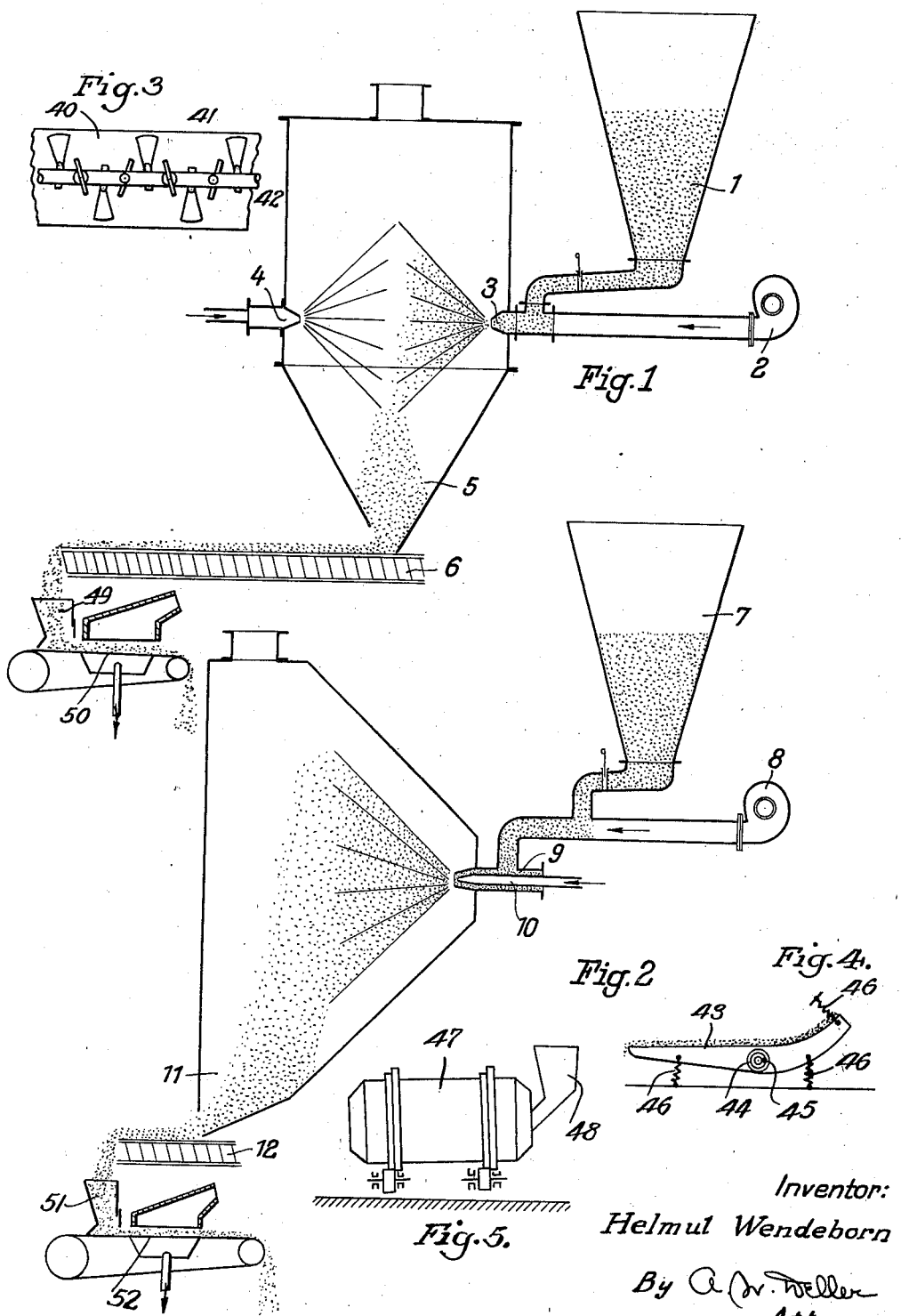
Inventor:
Helmut Wendeborn
By A. W. Weller
Attorney Patented July 4, 1939

2,165,084

UNITED STATES PATENT OFFICE

2,165,084

PROCESS FOR THE PRODUCTION OF A SINTERED PRODUCT

Helmut Wendeborn, Frankfort-on-the-Main, Germany, assignor to American Lurgi Corporation, New York, N. Y., a corporation of New York Application May 13, 1937, Serial No. 142,375
In Germany May 20, 1936, 9 Claims. (Cl. 263—53)

This invention relates to a process for the production of a sintered product.

The first practical solution of the problem of either manufacturing cement by sintering on blast grates—especially induced-draught grates—the finely ground originating materials, subsequently transformed into a granular or crumbly condition, or of treating other endothermic fine materials likewise subsequent to their being transformed into a granular or crumbly condition, consisted in subjecting a mixture of the originating materials and the sinter returns, to a sintering operation. In this process it was also important to render the charge on the blast roasting grate sufficiently pervious to air by the granulation. To this end, according to one known process, the raw material was strewn over moistened cores of sinter returns, while the latter were being rolled in a drum. In this manner the cores became coated with thin shells of cement raw meal to which a part or the whole of the requisite amount of fuel may have previously been added. For this process considerable amounts of sinter returns are required ranging between 100 and 200% of the weight of the originating materials.

The invention contemplates a special preparation of the originating materials serving for the manufacture of cement or the like with a view to adapting them to the sintering operation on the grate, particularly an induced-draught grate, thus rendering the addition of sinter returns wholly, or for its greater part, superfluous.

According to the present invention the ground originating materials are distributed in a gaseous or liquid medium, and this mixture is treated with gas in the presence of moisture. By this means the originating materials are transformed into a porous and granulated condition and may be subjected to a sinter operation on the blast grate without admixture of sinter returns or adding only a small amount thereof, say 10-30% by weight.

Furthermore, it is an object of the invention to prepare for the manufacture of cement a mixture of the finely ground originating materials with a gaseous and a liquid medium, in which mixture the finely divided originating materials are in suspension, to transform the finely ground originating materials of the mixture into crumbs, and to sinter these crumbs mixed with fuel on a sintering grate by burning out the fuel by means of air sucked through the charge.

If sinter returns are added, one uses the fines produced upon removing the sintered product from the blast grate and crushing the clinker to the desired size or upon screening the clinker. It is, according to the invention, not necessary to use a larger amount of sinter returns for cement burning on the blast grate than obtained by this method.

Seeing that, according to the invention, the addition of sinter returns can wholly or partly be dispensed with, the throughput efficiency of the blast grate is considerably increased. At the same time the fuel consumption, referred to an equal amount of finished product, is notably reduced and it is no longer necessary to crush a portion of the production of clinker, as hitherto was required, so as to obtain sufficiently large amounts of sinter returns.

The process according to the invention ensures a transformation of the originating materials into granules or crumbs containing larger or smaller inclusions of air and exhibiting, for example, a shell-like or spongy texture, or which have the form of hollow balls or fractions thereof.

This special texture is the reason why the charge prepared in accordance with the invention shows a particularly favourable behaviour when sintered on the blast grate.

If, according to the invention, the originating materials are suspended in a gaseous medium, the process is carried out, for example, in such a manner, that the finely divided dry originating materials are projected, in admixture with air, through a nozzle or an opening similar to a powdered coal burner, whilst atomizing water at the same time, for example, in the same nozzle or by means of a second nozzle, so that the aqueous mist and the air are in intimate contact with the pulverized originating material. The water or a solution or a liquid mixture containing, for example, one or more of the additions mentioned later on, can also be caused to impinge in the form of a mist on to a film of dust. Air may also be replaced by other gaseous or vaporous media carrying the finely divided originating materials. As a result of the fine state of distribution, for example, of the raw meal by means of air, small amounts of air are deposited on the particles of dust whilst the mass is also wetted with water and the like and thus rendered plastic. In this manner a highly porous, crumbly material is obtained. The granules may be increased in size by agitation in an agitator, or by introduction into a bladed worm or a drum, and undergo slight compression without losing their specific character.

To the water, the solution, the liquid mixture, the gas or steam used for the atomization of the material there may also be added substances such as soap, tar, fatty acids, oil and the like, which are adapted to impart sufficient tenacity and strength to the texture of the granules or crumbs. Such substances may also be added in the various methods of carrying out the invention hereinafter described.

If the material so prepared, in admixture with fuel, which may be added before, during or after the transformation of the originating materials into granular condition, is disposed as a layer with the ordinary depth of about 15–30 (for instance 20) cm. on a similar grate and ignited on the surface, it will burn to uniformly calcined clinker free from imperfectly burned portions.

In the Figures 1 and 2, for example, there are shown vertical sections of two different contrivances which, according to the invention, are suitable for the process.

Fig. 3 illustrates a side elevational view, somewhat fragmentary, of a bladed worm employed in the process of the invention;

Fig. 4 depicts a side elevational view of a vibrating table; and

Fig. 5 shows a similar view of a rotary drum.

In bin 1 (Figure 1) is the pulverulent material, for instance cement raw meal, which is atomized by means of air produced by fan 2 and passing through nozzle 3. Through nozzle 4 water is atomized in the opposite direction thus forming crumbs which collect in the vessel 5. The crumbs leave the vessel 5 through a shaking contrivance 6, whence they may be taken to a sinter plant of known design. For example, the slightly consolidated crumbs may go directly into a hopper 49, thence to be fed to the moving links of an induced-draught blast grate 50, to be sintered thereon. Since the grate to be used may be of a conventional character, a detailed description of its operation is unnecessary. Instead of allowing the pulverized raw meal to impinge on atomized water, one may just as well admix water and air to the raw meal in a double nozzle, these substances moving in joint flow. The raw meal in the vessel 7 (Figure 2) is carried by means of air delivered by fan 8 to the pipe 9 of the double nozzle and atomized when leaving this nozzle, while the requisite water passes through the pipe 10 into the nozzle to be likewise atomized. The crumbs produced in this manner are discharged from the vessel 11 by means of a vibrating or shaking conveyor 12. From here they go into a hopper 51, to be fed to an induced-draught blast grate 52 and there sintered.

Figs. 3, 4 and 5 illustrate various devices employed in the process of the invention for consolidating the crumbs obtained from the finely ground atomized materials. Thus, Fig. 3 depicts a worm 40 having blades or knives 41 mounted on a shaft 42. During rotation of shaft 42, the crumbs fed to the worm are displaced in the horizontal direction and are consolidated. Fig. 4 shows a vibrating table 43, oscillatably mounted on springs 46. The table is maintained in vibrations by means of a shaft 44 and of an eccentric 45 in the conventional manner. The vibrations of the table consolidate the crumbs produced by the process of the invention. Fig. 5 illustrates a side elevational view of a rotary drum 47 of a slightly inclined character. The material to be treated is introduced into the drum by means of a hopper 48 and the slightly consolidated crumbs are discharged at the other end of the drum. In view of the fact that the devices illustrated in Figs. 3, 4 and 5 are of a conventional character and well known to those skilled in the art, no detailed description of their operation will be necessary.

Having now particularly described and ascertained the nature of my said invention and in what manner the same is to be performed I declare that what I claim is:

1. The process of producing cement which comprises atomizing finely ground raw materials by a gaseous medium, intimately mixing a liquid medium with said finely ground atomized materials to cause the formation of crumbs therefrom, charging said crumbs in admixture with fuel onto a grate, and forcing air through said charge to cause burning of said fuel and sintering of said crumbs.

2. The process of producing cement which comprises atomizing finely ground raw materials by a gaseous medium, intimately mixing a liquid medium with said finely ground atomized materials to cause the formation of crumbs therefrom, agitating said crumbs to slightly consolidate the same, charging said crumbs in admixture with fuel onto a grate, and forcing air through said charge to cause burning of said fuel and sintering of said crumbs.

3. The process of producing cement which comprises atomizing finely ground raw materials by a gaseous medium, intimately mixing a liquid medium with said finely ground atomized materials to cause the formation of crumbs therefrom, slightly consolidating said crumbs in a rotary drum, charging said crumbs in admixture with fuel onto a grate, and forcing air through said charge to cause burning of said fuel and sintering of said crumbs.

4. The process of producing cement which comprises atomizing finely ground raw materials by a gaseous medium, intimately mixing a liquid medium with said finely ground atomized materials to cause the formation of crumbs therefrom, slightly consolidating said crumbs in a bladed worm, charging said crumbs in admixture with fuel into a grate, and forcing air through said charge to cause burning of said fuel and sintering of said crumbs.

5. The process of producing cement which comprises atomizing finely ground raw materials by a gaseous medium, intimately mixing a liquid medium with said finely ground atomized materials to cause the formation of crumbs therefrom, slightly consolidating said crumbs by shaking conveyers, charging said crumbs in admixture with fuel onto a grate, and forcing air through said charge to cause burning of said fuel and sintering of said crumbs.

6. The process of producing cement which comprises atomizing finely ground raw materials by a gaseous medium, itimately mixing a liquid medium with said finely ground atomized materials to cause the formation of crumbs therefrom, slightly consolidating said crumbs by vibrating means, charging said crumbs in admixture with fuel onto a grate, and forcing air through said charge to cause burning of said fuel and sintering of said crumbs.

7. The process of producing cement which comprises passing finely ground raw materials by a gaseous medium through a nozzle thereby atomizing said finely ground materials, passing a liquid medium through another nozzle thereby atomizing said liquid medium, intimately mixing the said atomized liquid medium with said finely ground atomized materials to cause the formation of crumbs therefrom, charging said crumbs in admixture with fuel onto a grate, and forcing air through said charge to cause burning of said fuel and sintering of said crumbs.

8. The process of producing cement, which comprises passing finely ground raw materials by a gaseous medium through a nozzle thereby atomizing said finely ground materials, passing a liquid medium through another nozzle thereby atomizing said liquid medium, intimately mixing said atomized liquid medium with said finely ground atomized materials to cause the formation of crumbs therefrom, agitating said crumbs to slightly consolidate the same, charging said crumbs in admixture with fuel onto a grate, and forcing air through said charge to cause burning of said fuel and sintering of said crumbs.

9. The process of producing cement which comprises passing finely ground raw materials by a gaseous medium through a nozzle thereby atomizing said finely ground materials, passing a liquid medium through another nozzle thereby atomizing said liquid medium, and adjusting said nozzles in a substantially coaxial direction to intimately mix said atomized liquid medium with said finely ground atomized material.

HELMUT WENDEBORN.